(12) United States Patent
Nakazawa et al.

(10) Patent No.: US 7,104,260 B2
(45) Date of Patent: Sep. 12, 2006

(54) EGR CONTROL UNIT AND METHOD FOR AN INTERNAL COMBUSTION ENGINE

(75) Inventors: Takashi Nakazawa, Kawasaki (JP); Takanobu Ikeuchi, Yokohama (JP)

(73) Assignee: Nissan Motor Co., Ltd, Yokohama (JP)

( * ) Notice: Subject to any disclaimer, the term of this patent is extended or adjusted under 35 U.S.C. 154(b) by 0 days.

(21) Appl. No.: 11/159,403

(22) Filed: Jun. 23, 2005

(65) Prior Publication Data
US 2006/0102148 A1 May 18, 2006

(30) Foreign Application Priority Data
Jun. 28, 2004 (JP) .............................. 2004-189256

(51) Int. Cl.
F02M 25/07 (2006.01)
F02D 41/18 (2006.01)
F16K 31/04 (2006.01)

(52) U.S. Cl. ................................ 123/568.21; 123/436

(58) Field of Classification Search ................ 123/436, 123/399, 568.11, 568.21, 568.23, 568.24, 123/568.25, 568.26, 568.27; 701/108; 251/129.11; 73/117.3, 118.1, 118.2
See application file for complete search history.

(56) References Cited
U.S. PATENT DOCUMENTS

| | | | | |
|---|---|---|---|---|
| 5,560,336 A | | 10/1996 | Takahashi et al. | |
| 5,724,950 A | * | 3/1998 | Shino et al. | ............ 123/568.21 |
| 6,016,788 A | * | 1/2000 | Kibe et al. | ............. 123/568.21 |
| 6,021,765 A | * | 2/2000 | DeGroot et al. | ........ 123/568.21 |
| 6,079,387 A | * | 6/2000 | Mamiya et al. | ............. 123/399 |
| 6,142,119 A | * | 11/2000 | Abe et al. | .................... 123/436 |
| 6,354,269 B1 | * | 3/2002 | Saito et al. | .................. 123/436 |
| 6,868,329 B1 | * | 3/2005 | Ito et al. | ...................... 701/108 |
| 6,934,619 B1 | * | 8/2005 | Read et al. | ................... 123/436 |
| 2005/0028785 A1 | * | 2/2005 | Harunari et al. | ........ 123/568.21 |

FOREIGN PATENT DOCUMENTS

| | | | | | |
|---|---|---|---|---|---|
| JP | 04136436 A | * | 5/1992 | ............ | 123/568.21 |
| JP | H07-247894 | | 9/1995 | | |
| JP | H07-259627 | | 10/1995 | | |
| JP | 10089157 A | * | 4/1998 | ............ | 123/568.21 |
| JP | 3000694 B2 | * | 1/2000 | ............ | 123/568.21 |
| JP | 2000199454 | | 7/2000 | | |
| JP | 2002-048011 | | 2/2002 | | |

* cited by examiner

Primary Examiner—Willis R. Wolfe, Jr.
(74) Attorney, Agent, or Firm—Global IP Counselors

(57) ABSTRACT

An EGR control method and unit for an internal combustion engine includes an EGR passage configured to recirculate a portion of an exhaust gas from an exhaust system to an intake system. An EGR valve, disposed in the EGR passage, is configured to control an amount of EGR, and an index calculator is configured to calculate a surge-increase index according to a variance in rotation of the engine. A detector is configured to compare the surge-increase index with a determination threshold to detect a surge increase, an adjuster is configured to adjust a correction value relative to a target amount of the EGR according to an output of the detector, and a target-amount calculator is configured to calculate the target amount of the EGR by subtracting the correction value from a reference target amount of the EGR determined based upon an engine operating condition.

20 Claims, 7 Drawing Sheets

EGR CONTROL UNIT AND METHOD FOR AN INTERNAL COMBUSTION ENGINE

CROSS-REFERENCE TO RELATED APPLICATIONS

The present application claims priority under 35 U.S.C. § 119 of Japanese Patent Application No. 2004-189256, filed on Jun. 28, 2004, the entire content of which is expressly incorporated by reference herein.

BACKGROUND OF THE INVENTION

1. Field of the Invention

The present invention relates to an EGR (Exhaust Gas Recirculation) control unit for an internal combustion engine, and more particularly, the present invention relates to an EGR control unit that avoids an increase in a surge (torque fluctuations).

2. Description of Related Art

In Japanese Unexamined Patent Publication No. 2002-048011, surge level index calculating means is provided for calculating a surge level index to detect a surge occurring in the engine on the basis of information related to an angular velocity of an engine crankshaft, and surge-level determining means is provided for determining the surge level from a comparison between the surge level index and a determination threshold. Accordingly, an opening degree of an EGR valve is controlled on the basis of the change in the surge level and the surge level.

In Japanese Unexamined Patent Publication No. 2002-048011, for controlling the opening degree of the EGR valve, particularly a step motor type EGR valve, a basic amount of EGR based on an engine speed and an engine load is multiplied by a limit value based on a target value which is increased/decreased on the basis of a change in a surge level and the surge level, thereby to calculate the amount of the EGR. Then, based on the amount of EGR, a motor target position of the step motor type EGR valve is determined. The step motor type EGR valve is driven according to a comparison result between the motor target position and a current motor position.

Also in Japanese Unexamined Patent Publication No. 2000-199454, an atmospheric pressure and an intake negative pressure are monitored, respectively and a ratio of an exhaust pressure to an intake pressure is calculated and divided by the flow of EGR in order to calculate an effective opening area, thereby estimating a shift in an opening area of the EGR valve (initial stage/degradation).

When the surge increase is detected to correct the amount of the EGR, it is difficult to properly determine a correction amount of feedback unless different correcting methods are used between a case that a tolerance ratio of the EGR due to an environmental change is reduced and a case that the opening area of the EGR valve is shifted (initial stage/degradation). For this reason, in the multiplication correction (gain correction) disclosed in Japanese Unexamined Patent Publication No. 2002-048011, it is possible to deal only with an environmental change. However, it is difficult to deal with the shift of the opening area of the EGR valve. When an operating point is shifted, the surge increase continues until the surge level determination is performed again.

As another method of correcting the opening area of the EGR valve, in Japanese Unexamined Patent Publication No. 2000-199454, the atmospheric pressure and the intake negative pressure are monitored respectively, thereby estimating the shift of the opening area of the EGR valve. However, it is necessary to provide an atmospheric pressure sensor and an intake negative pressure sensor, thus increasing complexity and cost.

SUMMARY OF THE INVENTION

The present invention provides an EGR control unit for an internal combustion engine. The surge increase is caused by the environment change and the component variation, and tends to occur when the environment change and the component variation are combined. In the invention, an EGR ratio is minimized, so that the surge increase due to the environment change is eliminated. Accordingly, in the present invention, it is possible to reliably deal with the surge increase due to the component variation.

In a feature the present invention, a surge-increase index is calculated on the basis of rotational fluctuations in the engine, then the surge-increase index is compared with a determination threshold to determine the presence or absence of the surge increase, then a correction value with respect to a target amount of EGR is calculated on the basis of the determination of the presence of the surge increase, and then the correction value is added to or subtracted from the target amount of the EGR to correct the target amount of the EGR.

When the surge increase caused by the shift of the opening area of the EGR valve occurs, a proper correspondence with the correction value is achieved by performing an addition/subtraction correction, namely an offset correction, resulting in a good balance of fuel efficiency and drivability.

According to a feature of the invention, a surge-increase index is calculated on the basis of engine rotation fluctuations, then the surge-increase index and a determination threshold are compared to determined the presence or absence of the surge increase, and then a correction value for a target amount of EGR is calculated on the basis of the determination of the presence of the surge increase. Then, the correction value is added to/subtracted from the target amount of the EGR to correct the target amount of the EGR. Thereby, an addition/subtraction correction, namely an offset correction is performed for the surge increase caused by the shift of the opening area of the EGR valve, and therefore it is possible to properly correspond the addition/subtraction correction to a correction value and a good balance of fuel efficiency and drivability (surge reduction) is obtained.

According to another feature of the invention, during the ignition ON position, whenever the presence of the surge increase is determined, a predetermined value is added to the correction value to increase the correction value, thereby avoiding the surge increase with reliability.

According to a further feature of the invention, by providing a limiter for limiting the correction value to a maximum value when the correction value exceeds a predetermined maximum value, it is possible to prevent overcorrection.

According to yet another feature of the invention, when the ignition is shifted from OFF to ON or is started, by changing the correction value to a predetermined initial value, with consideration to the fact that surge increase does not occur unless the environmental changes and the component variations overlap inconveniently, it is possible to avoid the undue correction produced from the history, and to simplify the memory function during the ignition OFF state.

According to an additional feature of the invention, regardless of an operation condition in which the presence of the surge increase is determined, the correction value is used to correct the target amount of the EGR in all operation conditions, thus performing a simple control by allowing for the characteristics of component variations.

According to still another feature of the embodiment, instead of the target amount of the EGR, a target EGR-valve-opening area or a target number of steps is used to calculate, as the correction value, an alternative correction value for the target EGR-valve-opening area or the target number of the steps is calculated, then the correction value is added to/subtracted from the target EGR-valve-opening area or the target number of the steps to correct the target EGR-valve-opening area or the target number of the steps, that is, the amount of feedback correction does not correspond to the opening degree, but corresponds to the target EGR-valve-opening area or the target number of the steps. Thereby, it is possible to reliably deal with the shift in the opening area of the EGR valve, and further, even when the component characteristics such as a diameter of the EGR valve and a stroke are changed, it is possible to deal with the changed component characteristics by modifying the opening area and the number-of-steps characteristics, resulting in reduction of adapting processes.

According to an aspect of the invention, an EGR control unit for an internal combustion engine includes an EGR passage configured to recirculate a portion of an exhaust gas from an exhaust system to an intake system, an EGR valve disposed in the EGR passage configured to control an amount of EGR, an index calculator configured to calculate a surge-increase index according to a variance in rotation of the engine, a detector configured to compare the surge-increase index with a determination threshold to detect a surge increase, a corrector configured to calculate a correction value relative to a target amount of the EGR according to an output of the detector, an adjuster configured to adjust a correction value relative to a target amount of the EGR according to an output of the detector, and a target-amount calculator configured to calculate the target amount of the EGR by subtracting the correction value from a reference target amount of the EGR determined based upon an engine operating condition.

In another aspect of the invention, the adjuster may be configured to increase the correction value by a predetermined value every time the detector detects the surge increase while an ignition is ON.

In a further aspect of the invention, a limiter configured to limit the correction value to a maximum value when the correction value exceeds a predetermined maximum value, may be provided.

In an additional aspect of the invention, an initializer may be provided to set the correction value at a predetermined initial value when an engine is started.

In still another aspect of the invention, the target amount calculator may be further configured to apply the correction value adjusted by the adjuster in one operating condition to the reference target amount of the EGR in all operating conditions.

Another aspect of the invention provides a corrector configured to calculate a correction value relative to an opening area of the EGR valve according to an output of the detector, and an adjuster configured to adjust the correction value to correct the target opening area of the EGR valve.

Still another aspect of the invention provides a step motor that drives the EGR valve, a corrector configured to calculate a correction value relative to a target number of steps of the step motor according to an output of detector, and an adjuster configured to adjust the correction value to correct the target number of steps of the step motor.

According to another aspect of the invention, a method is provided for controlling EGR, the method including calculating a surge-increase index according to a variance in rotation of the engine, comparing the surge-increase index with a determination threshold to detect a surge increase, adjusting a correction value relative to a target amount of the EGR according to an output of the comparing, and calculating the target amount of the EGR by subtracting the correction value from a reference target amount of the EGR determined based upon an engine operating condition.

In another aspect of the invention the adjusting may increase the correction value by a predetermined value every time the comparing detects the surge increase while an ignition is turned ON.

In still another aspect of the invention, limiting the correction value to a maximum value when the correction value exceeds a predetermined maximum value may be performed. Additionally, setting the correction value to a predetermined initial value when an engine is started may be performed.

In yet another aspect of the invention, applying the adjusted correction value in one operating condition to the reference target amount of the EGR in all operating conditions may be performed.

Another aspect of the invention provides an EGR control unit having an EGR passage configured to recirculate a portion of an exhaust gas from an exhaust system to an intake system, an EGR valve disposed in the EGR passage configured to control an amount of EGR, a calculator configured to calculate a surge-increase index according to a variance in rotation of the engine, a detector configured to compare the surge-increase index with a determination threshold to detect a surge increase, a corrector configured to calculate a correction value according to an output of the detector, and an adjuster configured to adjust the correction value.

According to another feature of the invention, the corrector may be configured to calculate the correction value relative to a target opening area of the EGR valve, and the adjuster may be configured to adjust the correction value to correct the target opening area of the EGR valve.

According to a further feature of the invention, the corrector may be configured to calculate the correction value relative to a target number of steps of the step motor, and the adjuster may be configured to adjust the correction value to correct the target number of the steps of the step motor.

According to still a further feature of the invention, the corrector may be configured to calculate the correction value relative to a target amount of the EGR according to an output of the detector, and the adjuster may be configured to adjust the correction value to correct the target amount of the EGR.

Other exemplary embodiments and advantages of the present invention may be ascertained by reviewing the present disclosure and the accompanying drawings.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein.

DETAILED DESCRIPTION OF THE PREFERRED EMBODIMENTS

The following will explain, with reference to the above-described drawings, preferred embodiments of the present invention, in which like characters represent like elements. The particulars shown herein are by way of illustrative example of the embodiments of the invention only and are presented in the cause of providing what is believed to be the most useful and readily understood description of the principles and conceptual versions of the present invention. In this regard, no attempt is made to show structural details of the invention in more detail than is necessary for the fundamental understanding of the present invention, the description taken with the drawings making apparent to those skilled in the art how the several forms of the present invention may be embodied in practice.

Figure 1:
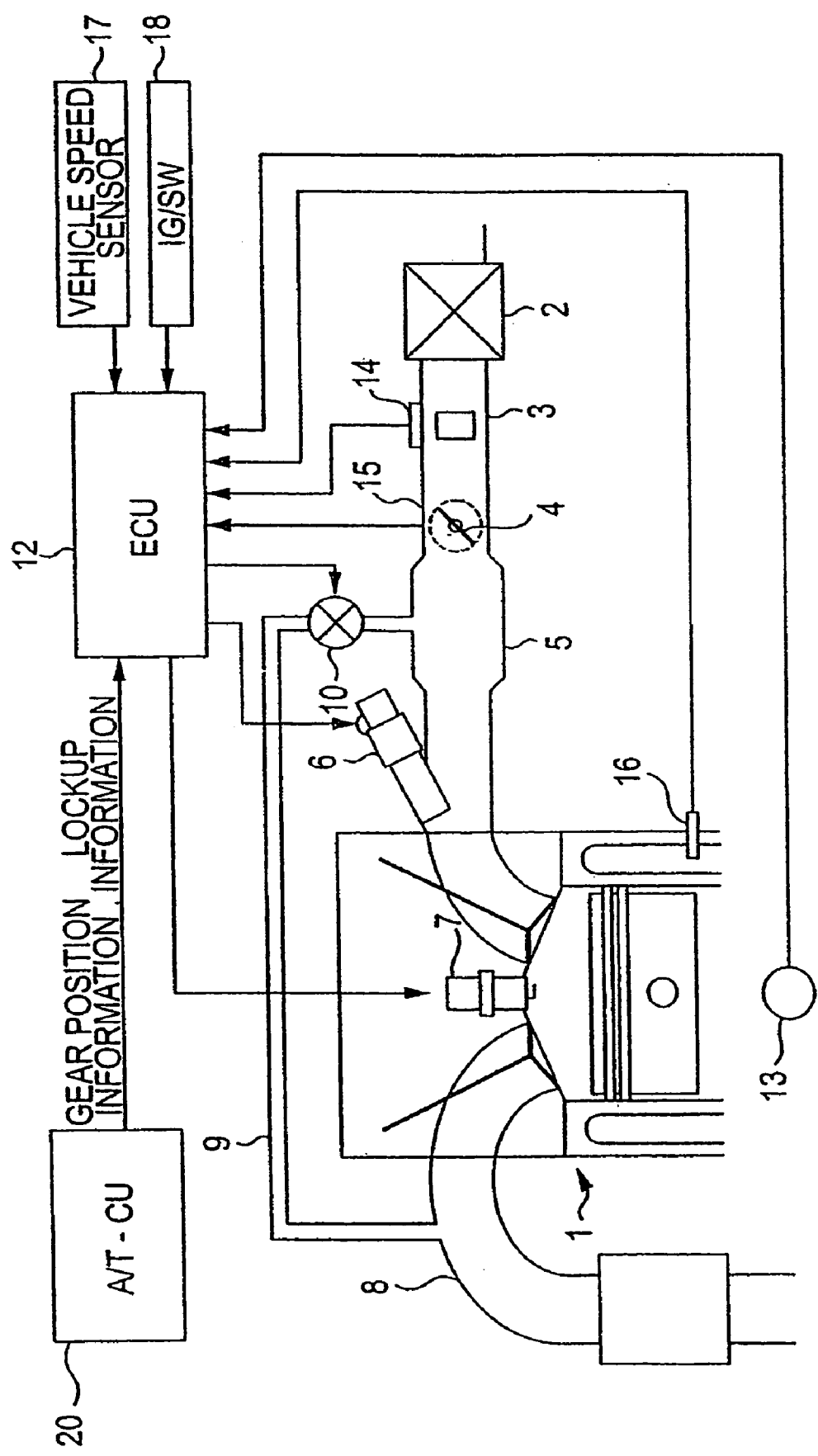
FIG. 1 is an exemplary schematic diagram of an engine illustrating an embodiment of the present invention.

FIG. 1 is an exemplary schematic diagram of a vehicle engine (internal combustion engine) illustrating an embodiment of the present invention. Air is introduced from an air cleaner 2 via an intake duct 3, a throttle valve 4 and an intake manifold 5 into the combustion chamber of each of cylinders of an engine 1. A fuel injection valve 6 is provided for each cylinder in each branch portion of the intake manifold 5. Note that the fuel injection valve 6 may be placed in a position directly facing the combustion chamber.

The fuel injection valve 6 is an electromagnetic fuel injection valve (injector) which is opened by power supply to a solenoid and closed by stopping the power supply thereto, and is opened by being energized by a drive pulse signal sent from an engine control unit (hereinafter referred to as "ECU") 12 which will described later, to inject and supply fuel which has been pressure-delivered from a fuel pump (not shown) and then adjusted to a predetermined pressure by a pressure regulator.

A spark plug 7 is provided in each combustion chamber of the engine 1, thereby creating a spark to ignite and burn a mixture. An ignition timing of the spark plug 7 is also controlled by the ECU 12.

An exhaust gas from each combustion chamber of the engine 1 is discharged through an exhaust manifold 8. An EGR passage 9 diverges from the exhaust manifold 8, thereby recirculating a portion of the exhaust gas through an EGR valve 10 into the intake manifold 5. An opening degree of the EGR valve 10 is also controlled by the ECU 12.

In a non-limiting embodiment, the ECU 12 is equipped with a computer including, e.g., a CPU, ROM, RAM, an A/D converter, an I/O interface and the like, and receives input signals from various sensors (described below), and controls the operations of the fuel injection valve 6, the spark plug 7, the EGR valve 10 and the like.

The various sensors may be provided as follows: a crank angle sensor 13 that generates a reference crank angle signal (REF signal) at every 180° turn of an crank angle, in the case of four cylinders, in synchronization with a crankshaft rotation of the engine 1, and is capable of detecting an engine speed "Ne" from the period of the "REF" signal; an air flow meter 14 that detects an intake air quantity "Qa" in the intake duct 3; a throttle sensor 15 detecting an opening degree "TVO" of the throttle valve 4; a water-temperature sensor 16 detecting a cooling water temperature "Tw" of the engine 1; a vehicle speed sensor 17 detecting a vehicle speed "VSP;" further an ignition switch (IG/SW) 18; and the like.

An output shaft of the engine 1 is coupled to an automatic transmission (not shown) equipped with a torque converter with a lockup clutch. A control unit for controlling the automatic transmission (hereinafter referred to as "A/T-CU") 20 is connected through a communication line with the ECU 12. The ECU 12 receives inputs of gear position information and lockup information from the A/T-CU 20.

The ECU 12 controls the EGR valve 10 as follows. A target amount of EGR (EGR ratio) which is set based on operation conditions (readily understood by one of ordinary skill in the art to include, but not be limited to, e.g., engine speed, intake air quantity, throttle position, cooling water temperature and vehicle speed) of the engine 1 is converted to a target opening area of the EGR valve, then the target opening area of the EGR valve is converted to an opening degree of the EGR valve, and then the EGR valve 10 is controlled on the basis of the opening degree of the EGR valve. When the EGR valve 10 is driven by a step motor, a target EGR amount (ratio) is converted to a target number of steps, and the EGR valve 10 is controlled on the basis of the target number of the steps.

In this connection, in the present invention, a surge increase index is calculated on the basis of the rotational fluctuations in the engine, then the surge increase index is compared with a determination threshold (described below) to determine the presence or absence of a surge increase, and then a target amount of EGR (a target opening area of the EGR valve or a target number of steps) is corrected on the basis of the determination of the presence of the surge increase, thereby avoiding an increase in a surge.

There are, however, various factors that may cause fluctuations in the amount of EGR, such as an environmental change (atmospheric pressure, humidity, intake-air temperature), intake-air measurement, the opening area of the EGR valve, and the isolating of the factors is difficult even when the surge increases.

If the object to which the correspondence control (described supra) is applied after the determination of the increase in surge is not selected carefully, a false correspondence results. For example, when a surge increase due to the variation in the opening area of the EGR valve occurs, the surge increase improves by correcting the variation of the opening area. If the target EGR ratio, however, is corrected, the surge is terminated in a certain region but increases at another operating point because the opening area and the EGR ratio differ according to the operating point.

On the other hand, when a combustion limit (i.e., the ratio of tolerance to EGR) decreases due to an environmental change, if the correspondence is applied to the opening area of the EGR valve, a false correspondence may result because the opening area and the EGR ratio differ according to the operating point.

A possible solution of the above-mentioned problem is to increase the feedback frequency. However, a wrong surge increase index may be calculated because of acceleration/deceleration or a change in running resistance. It is impossible to take measures against the surge increase during vehicle travel in which no surge determination is permitted.

Therefore, according to a feature of the present invention, adaptation is accomplished (i.e., the EGR ratio is minimized) in such a way as to prevent the surge increase even during environmental changes or variations in intake-air measurements, and thus the surge increase caused by variations in the opening area of the EGR valve is detected. Then, a correction value is calculated for a target opening area of the EGR valve or a target number of steps, and then an addition/subtraction correction (i.e., offset correction) is performed on the target opening area of the EGR valve or the target number of steps, thereby avoiding a surge. More specifically, when the valve position of the EGR valve is shifted within the range close to the open position with respect to the reference opening area, the opening area or the number of steps is corrected through a subtraction, thereby terminating the surge. It is evident to those of ordinary skill in the art that because the component characteristics (i.e., the opening area of the EGR valve) vary, the correction value for the opening area or the number of steps may be changed in all the operational areas without variation.

Figure 2:
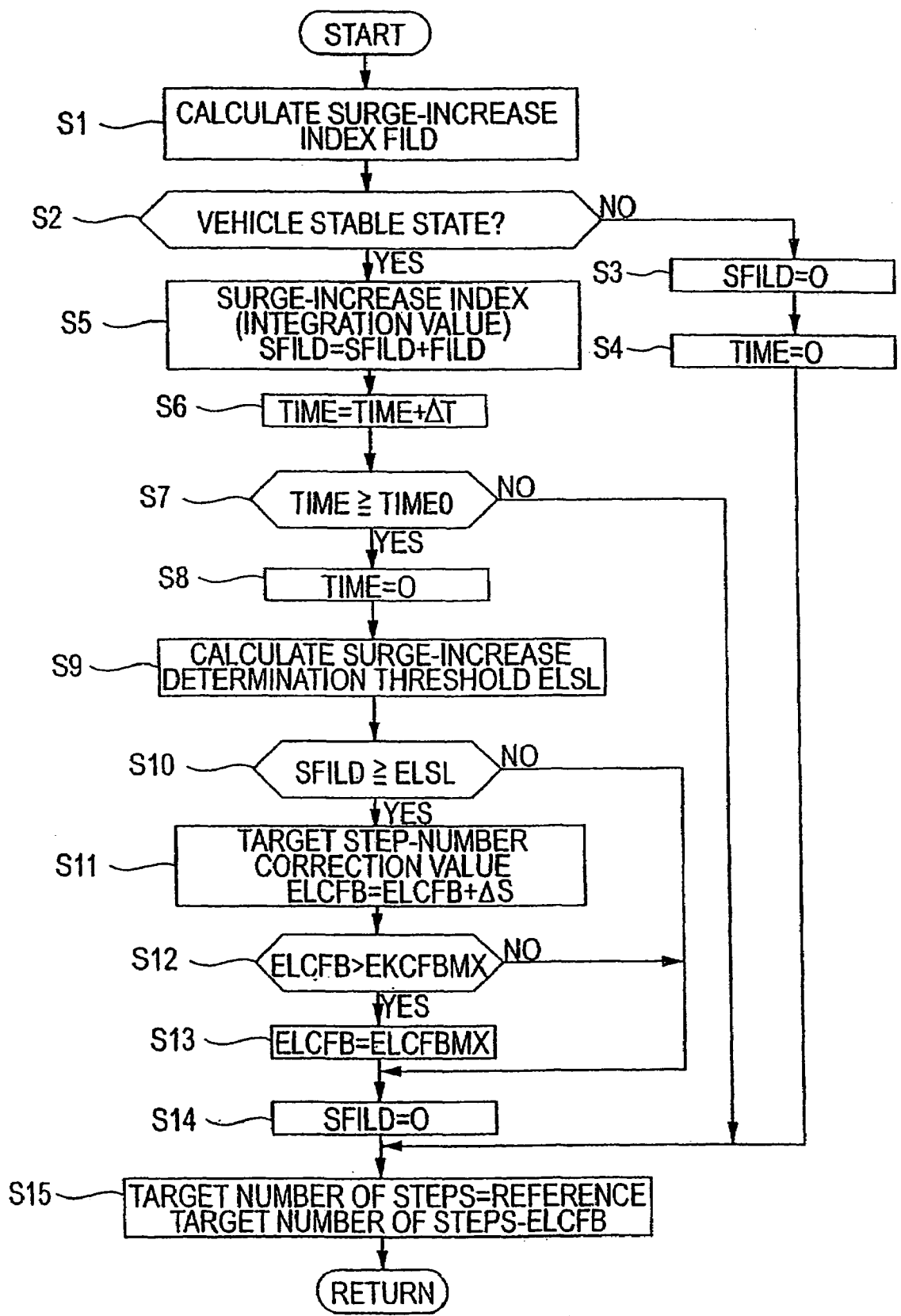
FIG. 2 is an exemplary flowchart of a correction routine for EGR control (a target number of steps)

Next, an example of specific control will be described with reference to the flow chart in FIG. 2. FIG. 2 is an exemplary flow chart of a correction routine for EGR control (a target number of steps) which is executed every 10 ms in time synchronization by the ECU 12.

At S1, a surge-increase index "FILD" per unit time is calculated on the basis of rotational fluctuations in the engine.

More specifically, a period "TREF" (ms) of a "REF" signal is measured in another routine executed in rotation synchronization (an interruption by a REF signal), and based on the period TREF, engine speed Ne(rpm)=30/TREF (in the case of a four-cylinder engine) is calculated. Then, the amount of fluctuations of the engine speed Ne is calculated and assumed as a surge-increase index FILD.

Note that since the rotational fluctuations in the engine include a noise component irrelevant to combustion stability, the noise component is eliminated by a method as known in commonly-assigned Japanese Unexamined Patent Publication 7-259627 and its U.S. family member, U.S. Pat. No. 5,560,336, both of which the entire content is expressly incorporated by reference herein. In other words, so that the quality of combustion stability is reflected to the frequency characteristics of rotational fluctuations, even though the rotational fluctuations in the engine are detected, from the detected rotational-fluctuation components the noise component coming from an error introduced in a process for the crank angle sensor is eliminated through a first BPF (Band Pass Filter), and a first BRF (Band Reject Filter) normalized by engine rotation frequency. Further, through a second BGF in which a gear ratio is detected and a coefficient is set according to the detected gear ratio, a noise component coming from deformation in a vehicle drive system is eliminated. Further, the rotation fluctuation component (frequency component) causing vibration making persons unpleasant is filtered through the second BPF, and then an effective value calculation is performed on the thus obtained signal to calculate a surge increase index FILD.

At S2, a determination is made whether or not the vehicle is in a stable state. At this point, whether or not the vehicle is in a stable state is determined by whether or not all of the following conditions (1) to (5) are satisfied.

(1) The vehicle state is in the EGR region (EGRQ>0). In other words, the vehicle state is in the process of performing EGR.

(2) A difference between a target EGR ratio and an actual EGR ratio is equal to or less than a predetermined value. In other words, the condition is that the EGR control is terminated, namely not in a transient state.

(3) The same transmission gear position is held continuously for a predetermined amount of time. In other words, the condition is that the gear is not in the process of being shifted.

(4) A basic amount of fuel injection "Tp" calculated on the basis of the amount of cylinder intake air is within a predetermined range.

(5) The vehicle is in steady running (#FCNST2=1).

FCNST2 is calculated in the following conditions (5-1) to (5-3):

(5-1) Determination of a change in a vehicle speed (DVSP)

When DVSP≧a predetermined value is obtained continuously a predetermined number of times, #FDVLLC=1 is assumed.

When DVSP≧a predetermined value is obtained continuously a predetermined number of times, #FDVLLC=0 is assumed.

(5-2) Determination of a change in rotation (DNe)

When DNe≧a predetermined value obtained continuously a predetermined number of times, #FDNLLC=1 is assumed.

When DNe≧a predetermined value obtained continuously a predetermined number of times, #FDNLLC=0 is assumed.

(5-3) Determination of steady running

When the state of #FDVLLC=1 (a small change in a vehicle speed) continues for a predetermined time period in the non-lockup state, or alternatively when the state of #FDNLLC=1 (a small change in rotation) continues for a predetermined time period in the lockup state, #FCNST 2=1 (steady running) is assumed.

When the state of #FDVLLC=0 (a large change in a vehicle speed) continues for a predetermined time period in the non-lockup state, or alternatively when the state of #FDNLLC=0 (a large change in rotation) continues for a predetermined time period in the lockup state, #FCNST 2=0 (unsteady running) is assumed.

On the other hand, if as a result of the above determinations, the vehicle is out of the stable state, that is, if any of the conditions (1) to (5) are not satisfied, the procedure goes to S3 and S4 to respectively set zero for a surge-increase index (integration value) SFILD and zero for an integration time TIME, and a current target-number-of-steps correction value "ELCFB" (initial value is zero) remains and the procedure goes to S15 described later.

As a result of the determinations, if the vehicle is in the stable state, that is, if the conditions (1) to (5) are all satisfied, the procedure goes to S5.

At S5, as the following equation expresses, a latest surge-increase index FILD per unit time is added to a surge-increase index (integration value) "SFILD."

SFILD=SFILD(a value of the previous time)+FILD

At S6, as the following equation expresses, an execution time interval Δt of the routine is added to the integration time TIME.

TIME=TIME(a value of the previous time)+Δt

At S7, a determination is made whether or not the integration time TIME reaches a predetermined sampling time TIME 0 (e.g. 2 sec).

If the integration time TIME does not reach the predetermined sampling time, there is no change, that is, the procedure goes to S15 described later while the current target-number-of-steps correction value ELCFB (initial value is zero) is retained.

If the integration time TIME reaches the predetermined sampling time (when TIME≧TIME 0), the procedure goes to S8.

At S8, the integration time TIME is cleared (TIME=0).

At S9, from a map of engine speeds and engine loads in each gear position, a determination threshold "ELSL" for determining the surge increase is calculated.

Figure 5:
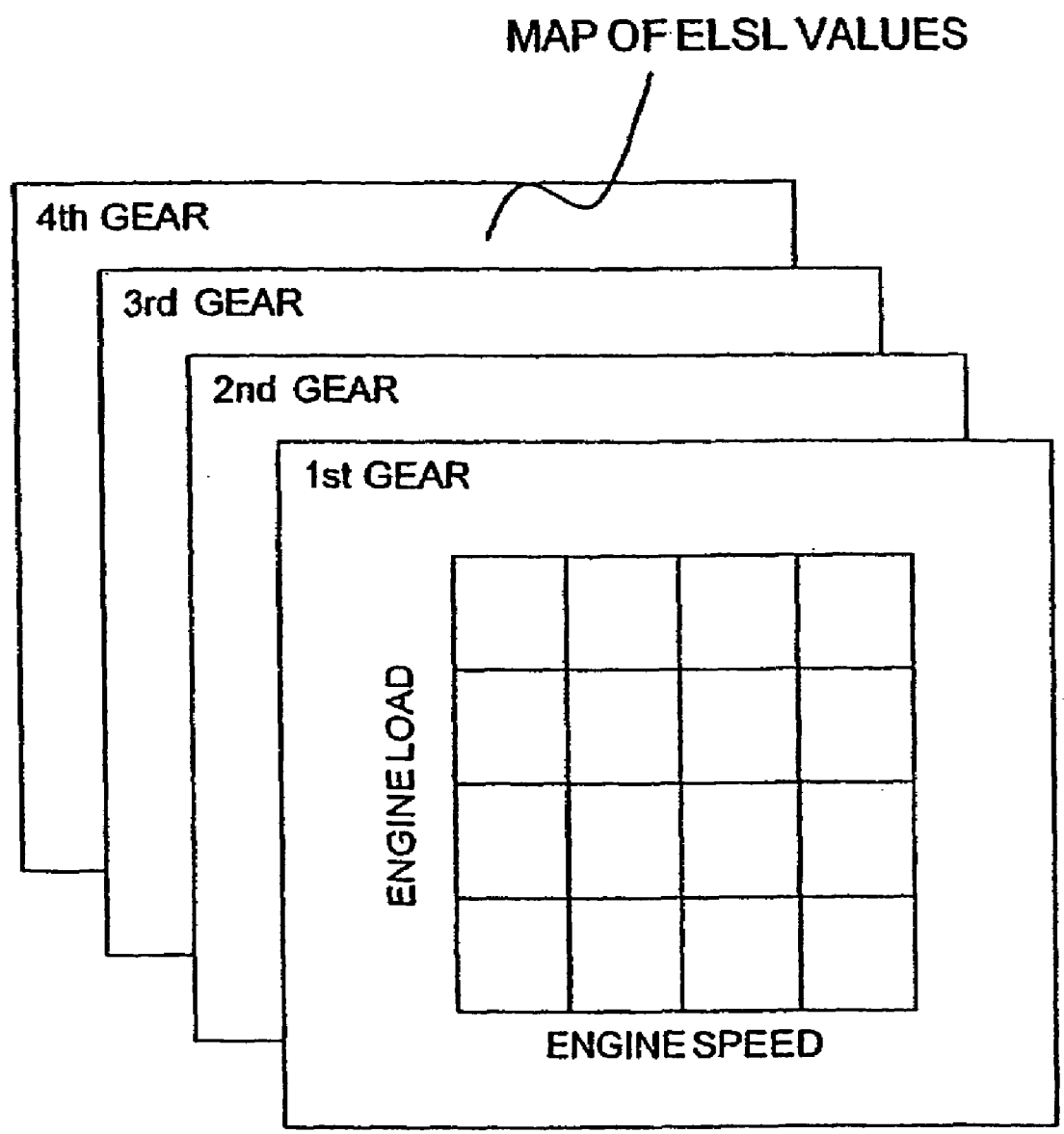
FIG. 5 is an exemplary map of engine speeds and engine loads in each gear position for calculating a determination threshold.

FIG. 5 is an exemplary set of maps of engine speeds and engine loads (each combination being an operating point or operation condition as described herein) in each gear position for calculating a determination threshold. As shown in FIG. 5, the map is typically a series of X-Y grids, from which the determination thresholds may be retrieved, e.g., according to a corresponding ELSL quadrant, or by interpolation between corresponding ELSL nodes.

It is evident to those of ordinary skill in the art that the determination thresholds corresponding to the operating conditions may be dependent upon many factors, including the geometry of the engine, and may be different for each engine configuration and different for the goals of the engine design (e.g., depending on a balance of desired performance, efficiency, emissions, surge suppression, and/or other goals). The invention does not depend upon the particular criteria considered in setting determination thresholds for the map. As noted herein, the determination threshold is generally set at a level where the surge-increase index, which is determined according to measurements relating to rotational fluctuations in the engine, is at a level such that the operation of the engine is deemed to be in a surge-increase state, and would benefit from a change in the amount of opening of the EGR valve.

At S10, the surge-increase index (integration value) SFILD and the determination threshold ELSL are compared to determine whether or not SFILD≧ELSL (surge-increase state).

If SFILD<ELSL is established, namely the surge-increase state is not established, the procedure goes to S14 (described later) while the current target-number-of-steps correction value ELCFB (an initial value is zero) is retained.

If SFILD≧ELSL is established, namely the surge-increase state is established, the procedure goes to S11.

At S11, as the following equation expresses, a predetermined value ΔS is added to the target-number-of-steps correction value ELCFB.

ELCFB=ELCFB(a value at the previous time)+ΔS

Figure 7:
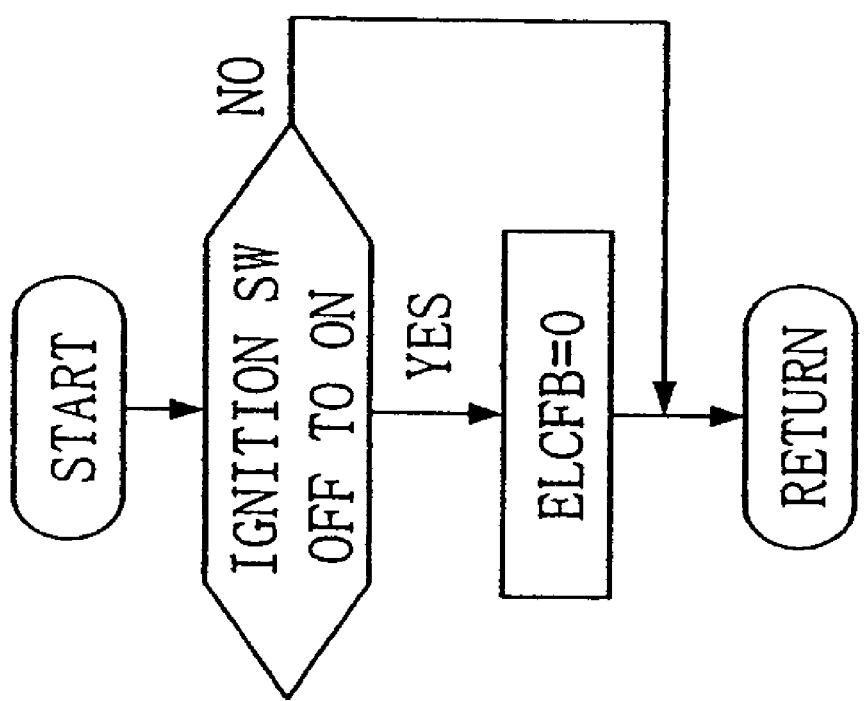
FIG. 7 is an exemplary flowchart of an initialization routine for EGR control.

At this point, the initial value of the target-number-of-steps correction value ELCFB is zero, as shown in FIG. 7, and the initialization is performed when the ignition is changed from OFF to ON.

Further, the predetermined value ΔS is set at a minimum number of steps, and the switching between 1-phase excitation and 2-phase excitation is possible. If the drive at every 0.5 steps by 1-phase excitation (weak excitation) is possible, the predetermined value ΔS is set at 0.5, for example.

At S12, the target-number-of-steps correction value ELCFB is compared with a predetermined maximum value "ELCFBMX" to determine whether or not ELCFB>ELCFBMX. If NO, any change is not made. If YES, ELCFB=ELCFBMX is established (as a limit) in S13. Thereafter, the procedure goes to S14. Note that the maximum value ELCFBMX results from the conversion of flow fluctuations caused by the variation of an assumed maximum opening area of the EGR valve into the number of steps, for example, 1.5 steps is assumed.

At S14, the surge-increase index (integration value) SFILD is cleared (SFILD=0) for the next integration.

At S15, as the following equation expresses, the target-number-of-steps correction value ELCFB (offset) is subtracted from a reference target number of steps which is determined based upon the engine speed and the engine load, thereby obtaining a final target number of steps.

Target number of steps=reference target number of steps-ELCFB

It should be noted that the correction value ELCFB employed in step S15 can be used at any operating condition, not just the operating condition in which the surge increase was detected. Operating conditions that use the correction value ELCFB are not limited to the operating condition at which the correction value ELCFB is calculated. When the surge increase is detected in one operation condition, the correction value ELCFB can be used to correct the target amount of EGR in all operation conditions.

Figure 6:
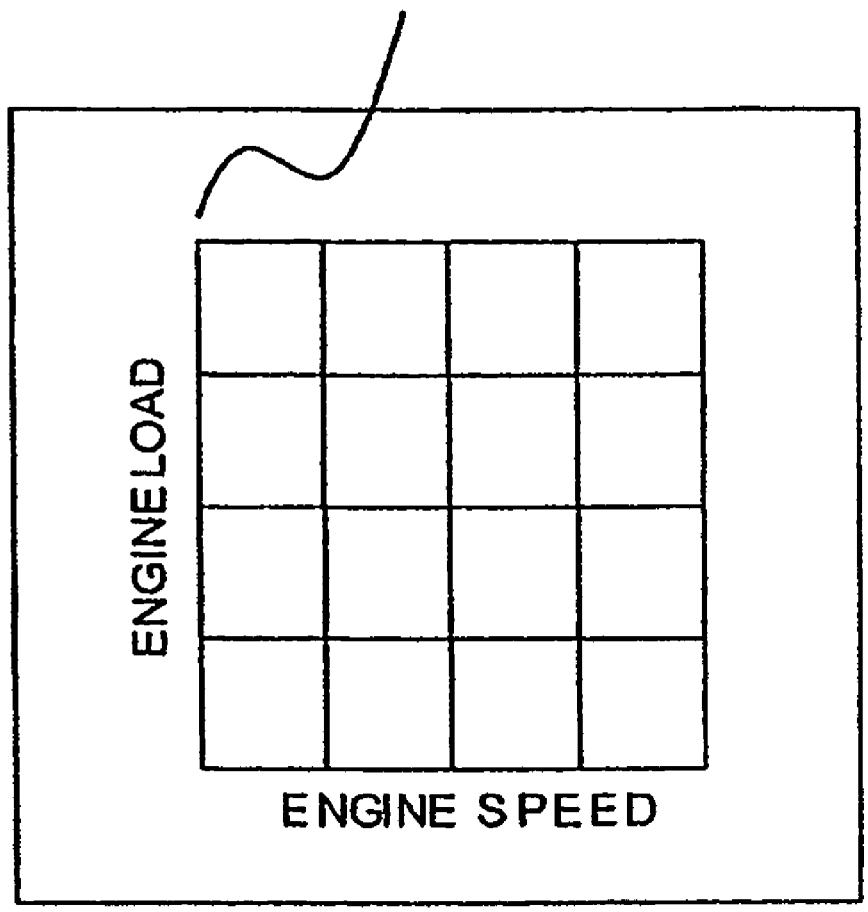
FIG. 6 is an exemplary map of engine speeds and engine loads for calculating a reference target number of steps.

FIG. 6 is an exemplary map of engine speeds and engine loads (each combination being an operating point or operation condition as described herein) in for calculating the reference target number of steps. As shown in FIG. 5, the map is typically an X-Y grid, from which the reference target number of steps may be retrieved, e.g., according to a corresponding reference target number of steps quadrant, or by interpolation between corresponding reference target number of steps nodes.

It is evident to those of ordinary skill in the art that the reference target numbers of steps corresponding to the operating conditions may be dependent upon many factors, including the geometry of the engine and EGR valve, and may be different for each engine and EGR valve configuration and different for the goals of the engine design (e.g., depending on a balance of desired performance, efficiency, emissions, surge suppression, and/or other goals). The invention does not depend upon the particular criteria considered in setting reference target numbers of steps for the map. As noted herein, the reference target number of steps is generally set at a higher (e.g., close to open) level, and the ELCFB correction is used to decrease the reference target number of steps.

By determining the target number of the steps in this manner, a command signal is output to the step motor for driving the EGR valve.

Figure 3:
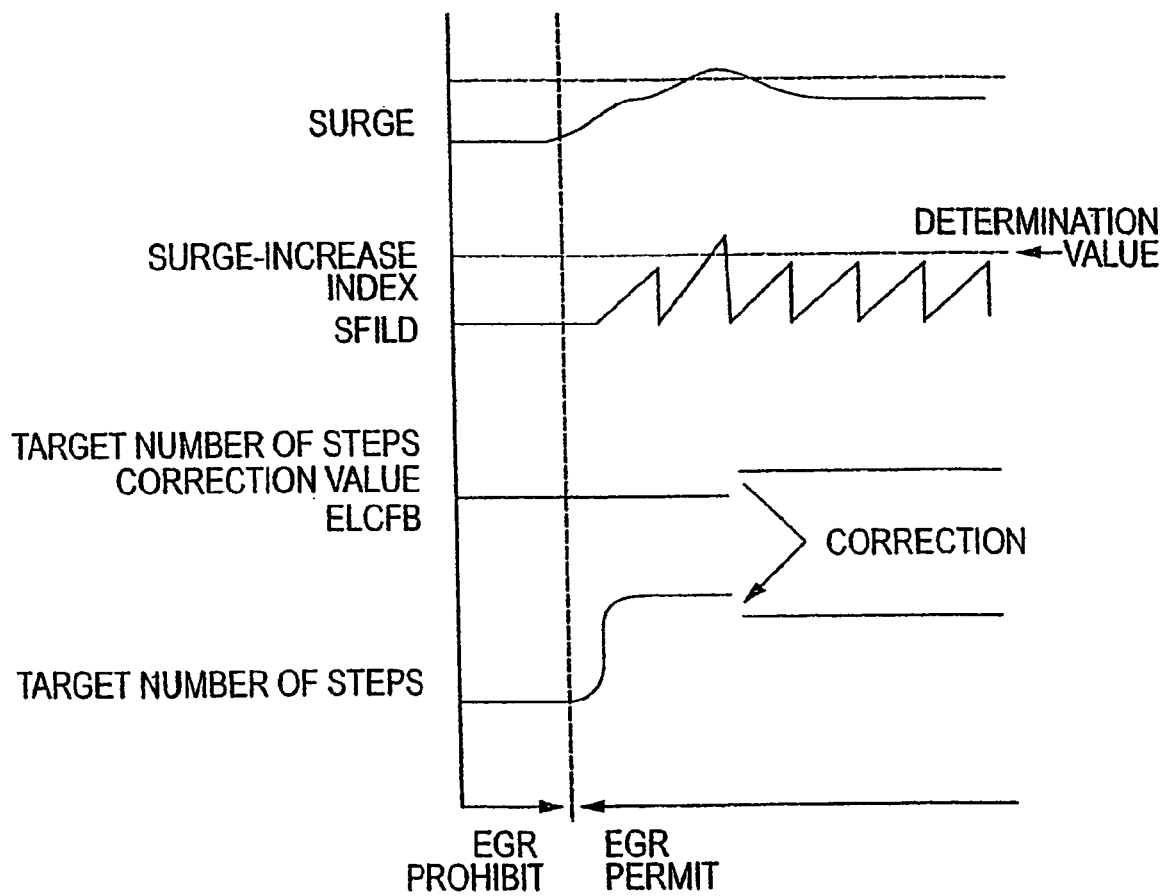
FIG. 3 is an exemplary timing chart of the present invention.

FIG. 3 shows an exemplary timing chart for EGR control, in which when the surge level changes toward an increasing state and the surge-increase index (integration value) SFILD exceeds the determination value threshold, the target-number-of-steps correction value ELCFB is increased from the initial value (0) to the predetermined value ΔS, and the target number of the steps is corrected toward a decrease side corresponding to the increase.

Figure 4:
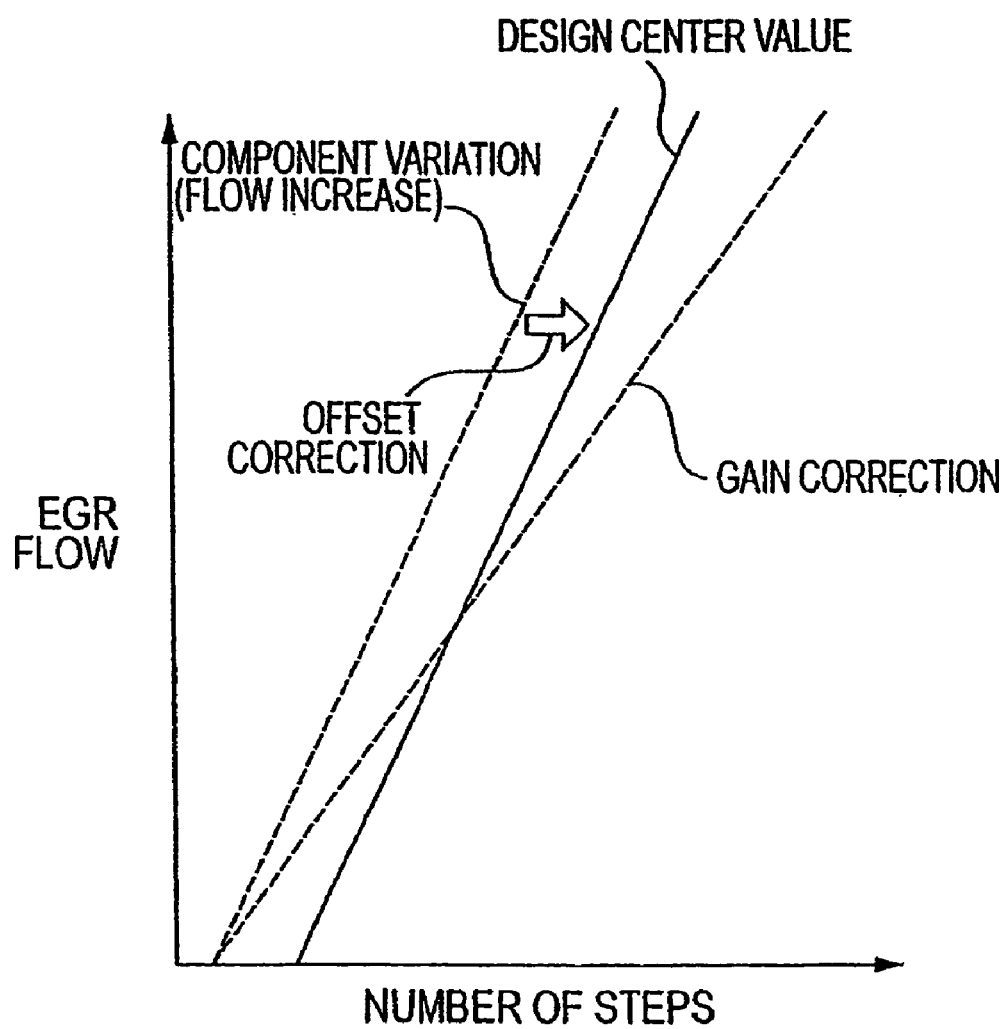
FIG. 4 is an exemplary graph showing the relationship between the number of steps and the EGR flow.

FIG. 4 shows a contrast between gain correction, which lacks the offset correction employed by the invention, and the offset correction employed by the invention. In FIG. 4, the graph depicts a relationship between the number of the steps and the EGR flow. As shown in FIG. 4, when flow increases with respect to a design center value due to, e.g., component variations, according to an embodiment of the invention, a surge increase is detected and the target number of the steps undergoes an offset correction, thereby making it possible to bring the EGR flow characteristics back to the design center value. However, in gain correction, it is nearly impossible to bring the EGR flow characteristics back to the design center value.

Although when the surge increase is detected in one operation condition, the adjuster is further configured to adjust the correction value to correct the target amount of the EGR in all operation conditions.

It is noted that appropriate data for generating the maps of FIGS. 5 and 6 can be empirically determined or modeled, but the generation of the maps of FIGS. 5 and 6 for a particular engine configuration or EGR valve configuration is a task that can be carried out by the exercise of ordinary skill.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its versions. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims. Alternative structures discussed for the purpose of highlighting the invention's advantages do not constitute prior art unless expressly so identified. No one or more features of the present invention are necessary or critical unless otherwise specified.

What is claimed is:

1. An EGR control unit for an internal combustion engine comprising:
    an EGR passage configured to recirculate a portion of an exhaust gas from an exhaust system to an intake system;
    an EGR valve disposed in the EGR passage configured to control an amount of EGR;
    a calculator configured to calculate a surge-increase index according to a variance in rotation of the engine;
    a detector configured to compare the surge-increase index with a determination threshold to detect a surge increase;
    a corrector configured to calculate a correction value relative to an opening area of the EGR valve according to an output of the detector; and
    an adjuster configured to adjust the correction value to correct the target opening area of the EGR valve.

2. An EGR control unit for an internal combustion engine comprising:
    an EGR passage configured to recirculate a portion of an exhaust gas from an exhaust system to an intake system;
    an EGR valve disposed in the EGR passage configured to control an amount of EGR;
    a step motor configured to drive the EGR valve
    a calculator configured to calculate a surge-increase index according to a variance in rotation of the engine;
    a detector configured to compare the surge-increase index with a determination threshold to detect a surge increase;
    a corrector configured to calculate a correction value relative to a target number of steps of the step motor according to an output of detector; and
    an adjuster configured to adjust the correction value to correct the target number of steps of the step motor.

3. An EGR control unit for an internal combustion engine comprising:
    an EGR passage configured to recirculate a portion of an exhaust gas from an exhaust system to an intake system;
    an EGR valve disposed in the EGR passage configured to control an amount of EGR;
    an index calculator configured to calculate a surge-increase index according to a variance in rotation of the engine;
    a detector configured to compare the surge-increase index with a determination threshold to detect a surge increase;
    an adjuster configured to adjust a correction value relative to a target amount of the EGR according to an output of the detector; and
    a target amount calculator configured to calculate the target amount of the EGR by subtracting the correction value from a reference target amount of the EGR determined based upon an engine operating condition.

4. The EGR control unit according to claim 3, wherein the adjuster is configured to increase the correction value by a predetermined value every time the detector detects the surge increase while an ignition is ON.

5. The EGR control unit according claim 3, further comprising
    a limiter configured to limit the correction value to a maximum value when the correction value exceeds a predetermined maximum value.

6. The EGR control unit according to claim 3, further comprising
    an initializer configured to set the correction value at a predetermined initial value when an engine is started.

7. The EGR control unit according to claim 3, wherein the target amount calculator is configured to apply the correction value adjusted by the adjuster in one operating condition to the reference target amount of the EGR in all operating conditions.

8. A method for controlling EGR in an internal combustion engine having an EGR passage for recirculating a part of an exhaust gas from an exhaust system to an intake system, and an EGR valve disposed in the EGR passage for controlling an amount of EGR, the method comprising:
    calculating a surge-increase index according to a variance in rotation of the engine;
    comparing the surge-increase index with a determination threshold to detect a surge increase;
    adjusting a correction value relative to a target amount of the EGR according to an output of the comparing; and
    calculating the target amount of the EGR by subtracting the correction value from a reference target amount of the EGR determined based upon an engine operating condition.

9. The method according to claim 8, wherein the adjusting increases the correction value by a predetermined value every time the comparing detects the surge increase while an ignition is ON.

10. The method according claim 8, further comprising limiting the correction value to a maximum value when the correction value exceeds a predetermined maximum value.

11. The method according to claim 8, further comprising setting the correction value to a predetermined initial value when an engine is started.

12. The method according to claim 8, further comprising applying the adjusted correction value in one operating condition to the reference target amount of the EGR in all operating conditions.

13. An EGR control unit for an internal combustion engine comprising:
  an EGR passage configured to recirculate a portion of an exhaust gas from an exhaust system to an intake system;
  an EGR valve disposed in the EGR passage configured to control an amount of EGR;
  a calculator configured to calculate a surge-increase index according to a variance in rotation of the engine;
  a detector configured to compare the surge-increase index with a determination threshold to detect a surge increase;
  a corrector configured to calculate a correction value according to an output of the detector; and
  an adjuster configured to adjust the correction value.

14. The EGR control unit according to claim 13, wherein the adjuster is configured to increase the correction value by a predetermined value every time the detector detects the surge increase while an ignition is ON.

15. The EGR control unit according claim 13, further comprising
  a limiter configured to limit the correction value to a maximum value when the correction value exceeds a predetermined maximum value.

16. The EGR control unit according to claim 13, wherein the corrector is further configured to set the correction value at a predetermined initial value when an ignition is switched from OFF to ON.

17. The EGR control unit according to claim 13, wherein when the surge increase is detected in one operation condition, the adjuster adjusts the correction value in all operation conditions.

18. The EGR control unit according to claim 13, wherein
  the corrector is configured to calculate the correction value relative to a target opening area of the EGR valve; and
  the adjuster is configured to adjust the correction value to correct the target opening area of the EGR valve.

19. The EGR control unit according to claim 13, further comprising
  a step motor configured to drive the EGR valve, and
  the corrector being configured to calculate the correction value relative to a target number of steps of the step motor; and
  the adjuster being configured to adjust the correction value to correct the target number of steps of the step motor.

20. The EGR control unit according to claim 13, wherein
  the corrector is configured to calculate the correction value relative to a target amount of the EGR according to an output of the detector; and
  the adjuster is configured to adjust the correction value to correct the target amount of the EGR.

* * * * *